United States Patent [19]

Honkawa

[11] 3,902,812

[45] Sept. 2, 1975

[54] PHOTOMETER USING THREE KINDS OF LIGHT WAVELENGTHS
[75] Inventor: Tadashi Honkawa, Katsuta, Japan
[73] Assignee: Hitachi, Ltd., Japan
[22] Filed: May 20, 1974
[21] Appl. No.: 471,601

[30] Foreign Application Priority Data
May 23, 1973 Japan.............................. 48-56761

[52] U.S. Cl. ............... 356/188; 356/189; 356/201; 356/223
[51] Int. Cl.² ........................ G01J 1/42; G01J 3/48
[58] Field of Search .......... 356/188, 189, 223, 184, 356/201

[56] References Cited
UNITED STATES PATENTS
3,694,092  9/1972  Hashimoto et al................. 356/188
3,833,304  9/1974  Liston............................ 356/188 X Primary Examiner—Palmer C. Demeo
Attorney, Agent, or Firm—Craig & Antonelli

[57] ABSTRACT

In the quantitative measurement of one of plural components contained in a specimen, three kinds of light wavelengths are used to eliminate the influence of two components except one to be measured. The outputs with respect to the three kinds of wavelengths are converted to the corresponding electric signals, which are in turn subjected to the logarithmic conversion. One output with respect to one of the three kinds of wavelengths is inverted in polarity and the polarity-inverted output is then combined with the other outputs so that the relationship between the light absorption quantity and the wavelength, concerning the component to be measured, can be obtained with the result that the quantity of the component in the specimen can be determined.

7 Claims, 5 Drawing Figures

PHOTOMETER USING THREE KINDS OF LIGHT WAVELENGTHS

The present invention relates to a photometer, and more particularly to a photometer using light including three kinds of wavelengths adapted for the light absorption measurement of mixed substances.

It often occurs that in the quantitative analysis of one of components contained in a composite body of mixed ingredients by means of a photometer, the absorption waveform of the analyzed component overlaps those of the undesired components. With a photometer using only one light wavelength, in such a case, the measurement is affected by components other than the desired one, to cause a considerable error.

There are known two conventional methods according to which the influence of components other than the desired one is eliminated by the use of two kinds of light wavelengths. According to the methods, the degree of light absorption of one B of the undesired components is previously measured with respect to the light having a wavelength $\lambda b$ suitable for the measurement of the undesired component B while the degree of light absorption of the undesired component B is then measured with respect to the light having a wavelength $\lambda a$ suitable for the measurement of the desired component A, so that the ratio of the light absorption degree with repect to wavelength $\lambda a$ to that with respect to $\lambda b$, concerning the undesired component B, is obtained. The degree of light absorption of a desired component A in a specimen containing different ingredients can be obtained by subtracting the degree of light absorption of the specimen with respect to the wavelength $\lambda b$, multiplied by the above ratio, from the degree of light absorption of the specimen with respect to the wavelength $\lambda a$.

It is necessary in these conventional methods that the degree of light absorption of the undesired component B in the specimen should be individually and precisely measured. In practice, however, that condition can seldom be satisfied.

Therefore, it is one object of the present invention to provide a photometer which can measure the degree of light absorption of a desired component in a specimen whose undesired components cannot be individually measured.

Another object of the present invention is to provide a photometer which can measure the degree of light absorption of a desired component in a specimen even in case where the wavelength for the measurement of the desired component is overlapped by the absorption characteristics of other two components.

According to the present invention, there is provided a photometer comprising a first means for producing light including at least three kinds of light components each having a single wavelength, a second means for taking out said three kinds of light components separately, a third means for converting said three kinds of light components into three electric signals respectively after said light components are respectively passed through a specimen, a fourth means having hold units for respectively holding said three electric signals from said third means, and a fifth means for inverting the polarity of one of said three electric signals held by said fourth means with respect to those of the other signals and for summing the polarity-inverted signal and the other signals.

In the measurement according to the present invention, light including three different wavelengths is cast upon a specimen, the degrees of light absorption of the specimen with respect to the respective wavelengths are measured, and the sum of the signals with respect to two of the three wavelengths is made. Accordingly, the degree of light absorption of the desired component can be measured by making the difference between the sum and the signal with respect to the remaining one of the three wavelengths. And the quantity of the desired component can be determined by the measured value of light absorption degree and the associated wavelength.

The above and the other objects, features and advantages of the present invention will be apparent when the following description is read in conjunction with the accompanying drawings, in which.

Figure 1:
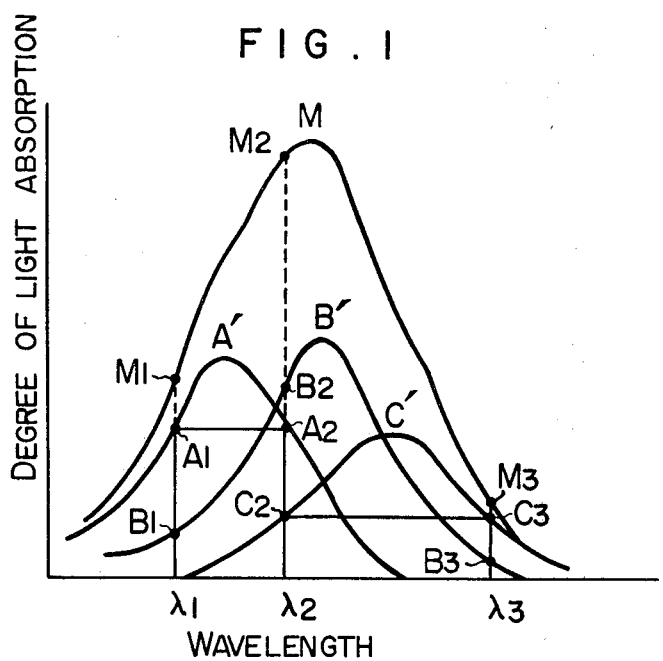
FIG. 1 shows the curves representing the degrees of light absorption of the specimen.

In FIG. 1 which shows the degrees of light absorption of the specimen for various wavelengths, the curve M is the light absorption characteristic of the specimen as a whole while the curves A', B' and C' are respectively the light absorption characteristics of the components A, B and C contained in the specimen. Let the component B be desired to be measured. Then, if the relation between the light absorption characteristic of the component B and the wavelength can be known, the quantity of the component contained in the specimen can be determined. The principle of the present invention will be described below with the aid of FIG. 1. A wavelength $\lambda_2$ is chosen such that each of the components A, B and C absorbs the light having the wavelength $\lambda_2$ and then two wavelengths $\lambda_1$ and $\lambda_3$ are chosen such that each of the wavelengths $\lambda_1$ and $\lambda_3$ is not absorbed in one of the components A, B and C. Namely, $\lambda_1$ is so chosen that the degree $A_2$ of light absorption of the component A with respect to $\lambda_2$ is the same as the degree $A_1$ of light absorption of the component A with respect to $\lambda_1$ and that the light absorption of the component C with respect to $\lambda_1$ does not take place. In like manner, $\lambda_3$ is so chosen that the degree $C_2$ of light absorption of the component C with respect to $\lambda_2$ is the same as the degree $C_3$ of light absorption of the component C with respcet to $\lambda_3$ and that the light absorption of the component A with respect to $\lambda_3$ does not take place. The wavelengths $\lambda_1$ and $\lambda_3$ can be determined by previously measuring the components A and C separately.

By determining the wavelengths $\lambda_1$, $\lambda_2$ and $\lambda_3$ in the manner described above, it holds that $A_1 = A_2$ and $C_2 = C_3$. And the degrees $M_1$, $M_2$ and $M_3$ of light absorption of the specimen with respect to $\lambda_1$, $\lambda_2$ and $\lambda_3$ can be expressed as follows.

$$M_1 = A_1 + B_1 \tag{1}$$

$$M_2 = A_2 + B_2 + C_2 \tag{2}$$

$$M_3 = B_3 + C_3 \tag{3}$$

Therefore, it follows that $$M_1 + M_3 - M_2 = A_1 + B_1 + B_3 + C_3 - A_2 - B_2 - C_2$$
$$= B_1 + B_3 - B_2 \qquad (4)$$

It is seen from the formula (4) that the degrees of light absorption of the component B alone can be obtained by directly measuring the degrees of light absorption of the specimen. Accordingly, the quantity of the component B in the specimen can be determined from the relationship between the value given by the formula (4) and the concentration of the component B.

Figure 3A:
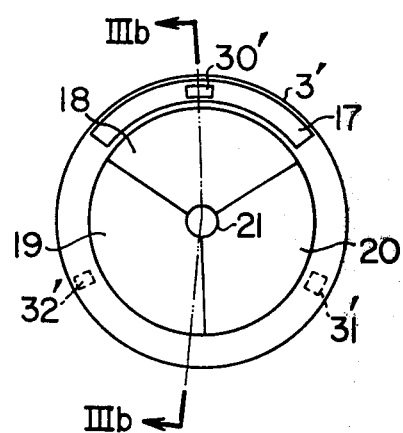
FIGS. 3a and 3b show the filter device and the synchronous signal generator used in the photometer shown in FIG. 2.
Figure 3B:
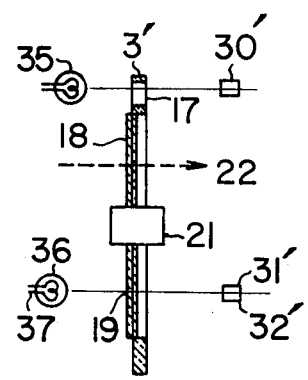
Figure 4:
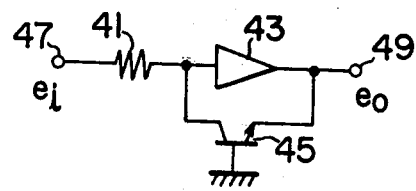
FIG. 4 shows a circuit of the logarithmic converter used in the photometer shown in FIG. 2.

Now, the present invention will be described by way of embodiment with the aid of FIGS. 2 to 4.

Figure 2:
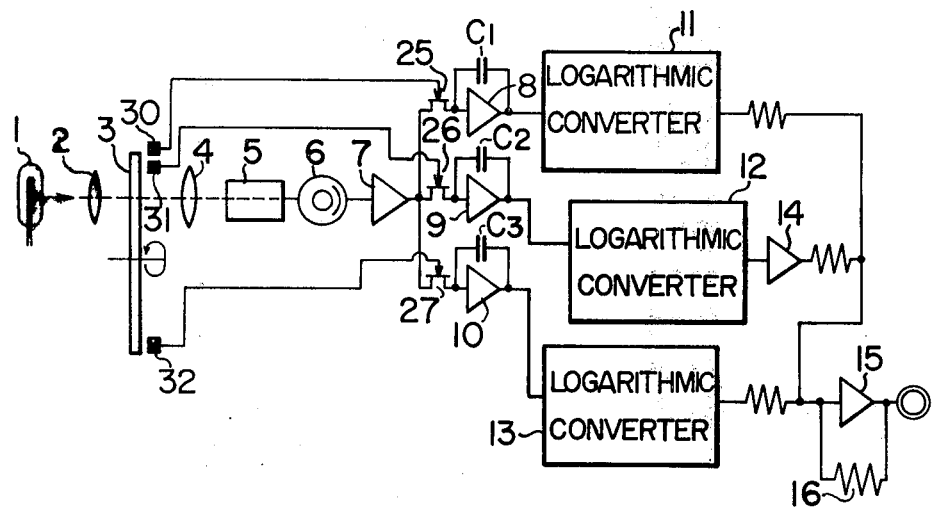
FIG. 2 is a block diagram of a photometer as one embodiment of the present invention.

In FIG. 2, light from a light source 1 is converged by means of a lens 2, passed through a filtering device 3, and cast on a lens 4. The light converged by the lens 4 is passed through a specimen 5 and converted to an electric signal in a detector 6. An amplifier 7 is connected with the detector 6. The filtering device 3 is provided with three kinds of optical filters to derive three kinds of monochromatic lights.

The light emanating from the light source 1 is passed through the filtering device 3 to produce three kinds of monochromatic components and the monochromatic components are converted, after having been passed through the specimen 5, into the corresponding electric signals in the detector 6. The detector 6 respectively receives the monochromatic components having wavelengths $\lambda_1$, $\lambda_2$ and $\lambda_3$. The electric signals formed from the basis of the monochromatic components are passed through the amplifier 7 and distributed to hold circuits 8, 9 and 10 through gates 25, 26 and 26 which are opened in response to the gating signals from synchronous pulse generators 30, 31 and 32 disposed in the vicinity of the filtering device 3. The signal with respect to $\lambda_2$, held in the hold circuit 9, is fed, after having been subjected to logarithmic conversion through a logarithmic converter 12, to an adder 15 via a polarity inverter 14. The signals with respect to $\lambda_1$ and $\lambda_3$, held in the hold circuits 8 and 10 in response to the gating signals from the synchronous pulse generators 30 and 32, are also fed to the adder 15 via logarithmic converters 11 and 13. The adder 15 delivers an output signal as given by the formula (4).

Next, the filtering device 3 will be described in further details with the aid of FIGS. 3a and 3b respectively showing the plan and in cross section along line III b—IIIb in FIG. 3a the structure of the principal portion of a filtering device embodying the present invention. The filtering device 3 has a rotatable disc 3' connected with a rotation shaft 21 in the center thereof and three optical filters 18, 19 and 20 to select specific wavelengths are provided around the shaft 21. A window 17 for obtaining gate signals is provided in the portion of the rotatable disc 3' near the outer edge of the filter 18. When the specimen is measured, the rotatable disc 3' is rotated so that the filters 18, 19 and 20 sequentially traverse the path of the light from the light source 1. The synchronous pulse generator 30, 31 and 32 are disposed, corresponding to the optical filters 18, 19 and 20, in the vicinity of and along the circular locus of the window 17 drawn as the disc 21 rotates. The synchronous pulse generators 30, 31 and 32 consist of a gate signal lamp 35 and a phototransistor 30', a gate signal lamp 36 and a phototransistor 31', and a gate signal lamp 37 and a phototransistor 32', respectively. The gate signal window 17 is located between the lamps and the phototransistors. Now, suppose that the optical filter 18 to obtain light having a wavelength $\lambda_1$ traverses the path 22 of the light from the source 1 and that the monochromatic component having wavelength $\lambda_1$ is detected, after having been passed through the specimen 5, by the detector 6. Then, at the same time, the light from the lamp 35 reaches, through the window 17, the phototransistor 30' corresponding to the filter 18 so that a gate signal is applied to the gate 25 to pass the signal with respect to $\lambda_1$ from the detector 6 to the hold circuit 8. In like manner, when the filter 19 or 20 to obtain a monochromatic component having a wavelength $\lambda_2$ or $\lambda_3$ traverses the path 22 of light from the light source 1, a gate signal corresponding to the filter 19 or 20 is delivered from the phototransistor 31' or =', respectively, so that the signal with respect to $\lambda_2$ or $\lambda_3$ is applied to the hold circuit 9 or 10. With this structure, the degrees of light absorption of the specimen can be obtained as by the formula (4).

The gates 25, 26 and 27 serve to pass the output of the amplifier 7 to the hold circuit 8, 9 and 10 when the gate signals from the phototransistors 30', 31' and 32' are received. In the circuit shown in FIG. 2, the gates 25, 26 and 27 are field effect transistors (FET). However, ordinary transistors or electromagnetic relays may also be used as such gates. In case where the electromagnetic relays are used as such gates, the outputs of the phototransistors should be amplified to excite the coils of the relays. The use of the electromagnetic relays raises, however, a problem that the speed of rotation of the filtering device 3 is limited since the relays has a poor response characteristic.

The photo-electric conversion can be performed with very high accuracy if a photomultiplier tube is used as the light detector 6. The hold circuits 8, 9 and 10 serve to hold for a predetermined period the electric signals from the field effect transistors serving as gates. Each of the hold circuits consits, for example, of an operational amplifier and a capacitor connected in parallel therewith, as shown in FIG. 2. For the improvement of the response characteristic of each hold circuit, a resistor should be connected in series with the capacitor.

The logarithmic converteres 11, 12 and 13 serve the subject the signals held in the hold circuits 8, 9 and 10 to logarithmic conversion. Each of the logarithmic converters has, for example, a circuit shown in FIG. 4, consisting of an input resistor 41, an operational amplifier 43 and a transistor 45. Suppose that $e_i$ and $e_o$ are respectively the voltages at the input and output terminals 47 and 49 of the converter. Then, it follows that $e_o = -\log e_i$. The polarity inverter 14 may be an ordinary amplifier which delivers a polarity-inverted output whose phase is different by 180° from that of the input. The circuit consisting of the amplifier 15 and the resistor 16 serves as an adder. The outputs of the logarithmic converters 11, 12 and 13 are fed through resistors to the amplifier 15, which delivers the sum of the outputs.

According to the present invention, any wavelength which can be absorbed by the desired component may be selected in place of $\lambda_2$, and moreover $\lambda_1$ and $\lambda_3$ need not be necessarily absorbed by the desired component B. In case where there is no light absorption by the component B with respect to $\lambda_1$ and $\lambda_3$, however, the formulae (1) and (3) must be modified such that $$M_1 = A_1 = A_2 \qquad (1)'$$

$$M_3 = C_3 = C_2 \qquad (3)'$$

and therefore $$M_1 + M_3 - M_2 = -B_2 \qquad (4)'$$

It is also apparent in case of the formula $(4)'$ that the quantity of the component B in the specimen can be determined.

As described above, according to the present invention, the quantity of the desired component in the specimen composed of mixed ingredients can be determined even if there is no light absorption of the desired component with respect to $\lambda_1$ and $\lambda_3$ and moreover no time is needed for the pre-treatment of the composite specimen.

What we claim is

1. A photometer comprising a first means for producing light including at least three kinds of light components each having a single wavelength, a second means for taking out said three kinds of light components separately, a third means for converting said three kinds of light components into three electric signals respectively after said light components are respectively passed through a specimen, a fourth means having hold units for respectively holding said three electric signals from said third means, and a fifth means for inverting the polarity of one of said three electric signals held by said fourth means with respect to those of the other signals and for summing the polarity-inverted signal and the other signals.

2. A photometer as claimed in claim 1, wherein said second means includes gate signal generating units for respectively generating gate signals with respect to the three taken-out wavelengths and said photometer further comprises gate units provided between said third means and said fourth means for respectively serving to pass the electric signals from said third means to said fifth means in response to the gate signals from said gate generating units.

3. A photometer as claimed in claim 2, wherein said second means includes three kinds of filters for respectively transmitting selectively said three kinds of light components, said filters being provided on a rotatable disc so that said filters traverse the light path between said first means and said third means in a predetermined order when said disc is rotated.

4. A photometer as claimed in claim 3, wherein each of said hold units of said fourth means includes an operational amplifier and at least one capacitor connected between the input and output terminals of said operational amplifier.

5. A photometer as claimed in claim 3, wherein said photometer futher comprises logarithmic converters respectively provided between said hold units and said fifth means.

6. A photometer as claimed in claim 5, wherein each of said logarithmic converters includes at least one operational amplifier and a transistor whose emitter and collector are connected with the input and output of said operational amplifier.

7. A photometer as claimed in claim 6, wherein said fifth means includes an amplifier for inverting the polarity of the output of one of said hold units of said fourth means and an operational amplifier for summing the outputs of the other hold units and the output of the polarity inverting amplifier.

* * * * *